(12) United States Patent  (10) Patent No.: US 6,764,162 B2
Biddle et al.  (45) Date of Patent: Jul. 20, 2004

(54) SHINGLE MASKS THAT REDUCE BANDING EFFECT ON INK JET PRINTERS

(75) Inventors: Mary Ellen Biddle, Lexington, KY (US); Brian Edward Cooper, Lexington, KY (US); Chengwu Cui, Lexington, KY (US); Buford Rodney Goble, Georgetown, KY (US); Ross William McFarland, Lexington, KY (US); Steven Frank Weed, Lexington, KY (US); Bryan Scott Willett, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 267 days.

(21) Appl. No.: 10/135,583

(22) Filed: Apr. 30, 2002

(65) Prior Publication Data

US 2003/0202215 A1 Oct. 30, 2003

(51) Int. Cl.[7] .................................................. B41J 23/00
(52) U.S. Cl. ............................ 347/37; 347/41; 347/15
(58) Field of Search .............................. 347/37, 15, 43, 347/41; 358/1.2, 1.9, 517

(56) References Cited

U.S. PATENT DOCUMENTS

| 4,999,646 | A | | 3/1991 | Trask |
| 5,209,878 | A | | 5/1993 | Smalley et al. |
| 5,790,150 | A | | 8/1998 | Lidke et al. |
| 5,992,962 | A | * | 11/1999 | Yen et al. ...................... 347/9 |
| 6,213,586 | B1 | | 4/2001 | Chen |
| 6,238,037 | B1 | | 5/2001 | Overall et al. |
| 6,318,832 | B1 | * | 11/2001 | Bates et al. ................... 347/15 |
| 6,561,609 | B2 | * | 5/2003 | Bauer .......................... 347/15 |

* cited by examiner

*Primary Examiner*—Lamson D Nguyen
(74) *Attorney, Agent, or Firm*—Frederick H. Gribbell, LLC

(57) ABSTRACT

An improved shingle mask is provided for use on ink jet printers which use multi-pass printing (shingling) to form bitmap images. The shingle mask is derived from a shingle mask density distribution which exhibits a substantially trapezoidal shape; the shingle mask density distribution is derived from an accumulated shingle mask distribution (also referred to as a "banding profile") having an overall shape of a plateau portion and a substantially smooth decreasing portion, which reduces the number of drops to be printed along the outermost edges of the mask on each swath. This shape reduces banding effects by effectively increasing a number of printed-density bands which are decreased in size, while at the same time not increasing the number of printhead passes over a given area on the print media (which otherwise would negatively impact printed throughput).

22 Claims, 11 Drawing Sheets

QUANTIZED "SMOOTH" ACCUMULATED SHINGLE MASK DISTRIBUTION (1-BIT)

SHINGLE MASKS THAT REDUCE BANDING EFFECT ON INK JET PRINTERS

TECHNICAL FIELD

The present invention relates generally to printing equipment and is particularly directed to ink jet printers of the type which uses multi-pass printing, called shingling, to form bitmap images of full intended coverage. The invention is specifically disclosed as a shingle mask that is derived from a shingle mask density distribution which exhibits a substantially trapezoidal shape, and thereby reduces banding effects by effectively increasing a number of printed-density bands which are correspondingly decreased in size, while at the same time not increasing the number of printhead passes over a given area on the print media, and thus not negatively impacting printed throughput.

BACKGROUND OF THE INVENTION

Banding is currently the primary defect in ink jet printing. Without banding, existing ink jet printing technology can easily achieve quality comparable to conventional photography. Typically, ink jet printers approach "photo quality" by using multi-pass printing. As the name implies, such printing makes multiple passes of the printhead, rather than the ordinary single pass printing. Each printing pass sub-samples the image by using a special "shingle mask" or "print mask." The sub-sampling, or "shingle mask," distributes the location errors of the individual ink drops caused by nozzle or nozzle firing abnormalities or other system errors. Such misplaced drops are blended with other normal ink drops, making the misplaced drops more difficult to detect. Multi-pass printing also increases the banding frequency, which makes the banding less visible and less objectionable to human visual systems. Therefore, the larger number of passes made using the multi-pass process, the better the print quality can be. However, increasing the number of passes involves a substantial penalty in throughput.

Various methods for designing a shingle mask to "average out" printing defects and to suppress banding are disclosed in existing patent documents. For example, Hewlett-Packard owns a number of patents involving using some type of print mask to reduce print artifacts, including banding-type artifacts. One of these patents is U.S. Pat. No. 5,992,962 (by Yen), which discloses a print mask used for ink jet printers that is designed to reduce print artifacts, both to reduce banding and print ink migration. The Yen invention reduces the banding by using multi-pass printing (also known as "shingling"), and states that the earlier prior art print masks had provided checkerboard patterns. In Yen, the print mask provides triangular clusters that are complimentary from the first pass to the second pass of printing. The primary example of the triangular clustered patterns used in Yen is illustrated on FIG. 6 (of Yen), in which the top row of one print pass is all dots, while that same top row in the second pass would be all non-dots. In the first pass, the top row is divided up into 4×4 tiles, and the dots in the top row represent the base of the triangle (per tile). Yen describes the complimentary print masks as being asymmetric, and also provides the benefits of turning off one of the top or bottom nozzles in each of the passes, which further helps to reduce banding artifacts. In addition to the above reduction of banding artifacts, the Yen patent describes "muffling" one or more nozzles of a first mask matrix in situations where a defective nozzle is determined, and that nozzle is then disabled in the first print pass. Then a complimentary nozzle is enabled in the second print pass to print all of the dots that would have been printed in the first pass by the defective nozzle.

U.S. Pat. No. 6,213,586 (by Chen, also owned by Hewlett-Packard) discloses an ink jet printer that produces temporally or spatially shingled images for a multicolor printhead. The example in the Chen patent is for a six-color ink jet printer, in which there are two different shades each of cyan and magenta. Each color has a "deposition mask" that comprises a matrix of threshold values, and each color has a set of "shingle control values." The deposition masks allow for both temporal and spatial shingling to occur during successive scans of the printhead so as to avoid or reduce image artifacts. The deposition mask is tiled on the bitmap, and the shingle control value set for each color determines whether or not a particular colored dot will be placed on a particular scan (or pass) of the printhead. The only clear example as to how this spatial or temporal shingling is supposed to reduce image artifacts is described on column 4 starting at line 46, where it states that the threshold values in each deposition mask are arranged to assure that the color intensities and amounts of ink deposited at swath extremities "closely match" between succeeding swaths.

U.S. Pat. No. 4,999,646 (by Trask, also owned by Hewlett-Packard) discloses a method for enhancing the uniformity and consistency of ink jet dot formation. This patent uses multiple pass complimentary dot patterns to minimize many undesirable characteristics, including coalescing, beading, and color bleed. Trask uses a partial overlap between multiple passes that use complimentary dot patterns. The dot spacing in coincident dot rows within the overlapped portions is alternated between dots of the first and second patterns. In addition to the above, Trask uses an "improved dot-next-to-dot" super pixeling to further optimize ink drop drying conditions to produce optimized uniformity and consistency of dot formation. The partial dot overlap process alleviates print quality problems in three ways: (1) a 50% checkerboard or other overlap pattern is chosen to minimize interactions between individual drops while they are drying; (2) the 50% dot pattern overlap of two swaths breaks up the horizontal drying patterns and minimizes banding; and (3) the use of alternating nozzles in the overlap dot rows minimizes the impact of nozzle variations.

Another U.S. patent in this area is owned by Colorspan Corporation, U.S. Pat. No. 5,790,150 (by Lidke), which discloses a method for controlling an ink jet printer in multipass printing. The pixel locations for each pass are controlled so that no pixel on a particular pass is orthogonally or diagonally adjacent to any other pixel location that is to be printed in the same pass. At least four passes are made on the print media before the printhead is advanced to a new swath. This also means that no pixel (dot) location is immediately adjacent to any other pixel (dot) location being printed on that pass.

Many conventional ink jet printers use a swath-by-swath approach and this approach typically causes various defects to appear periodically across the page, and is commonly known as the "banding defect." There are typically two types of density variations that comprise banding defects: high-frequency variations and low-frequency variations. Hi-frequency errors are generally caused by location errors in the placement of individual ink drops, probably originated from the printhead. Low-frequency density errors have a variety of causes, including halftone moiré patterns, alignment errors, and color difference caused by ink printing order changes. High-frequency density variations are the subject of conventional shingle mask designs. However, low-frequency density variations contribute substantially to the overall banding defects present in high-throughput printing methods that reduce the number of passes. The present inventors have conducted a study from which it was found that the human visual system is more sensitive to square wave variations than to other types of smooth variations of the same density contrast. It would therefore be advantageous to produce a smooth "banding profile," that will tend to reduce the visibility of banding defects.

Multi-pass printing on carriage-based printing technologies (e.g., used for ink jet printers) helps to relieve print defects created by mechanical tolerances such as banding and pel location error. Currently a bitmap is divided into swathes of information. Each swath contains a portion of the bitmap vertically, and also the entire width of the bitmap across the page. The vertical size of each swath is maximally the size of the ink jet printhead, but it may be smaller. When printing in a single-pass mode, the distance between the top scanline of a swath and the swath following is equal to the height of the swath. However, when printing in multi-pass modes, the distance between the top scanline of a swath and the swath following can be any distance less than the height of the swath. An example would be four-pass printing.

In a four-pass printing mode with a swath height of 320 (i.e., the number of nozzles on the printhead), the typical distance between the top of each successive swath would be 80 scanlines. In a 4-pass printing mode, each pel location will be passed over by a nozzle four times. For this reason, it is important to apply a print mask (or shingle mask) to each printed swath which prevents a pel from receiving more than the desired amount of ink.

In conventional ink jet printers, shingle masks have traditionally had a uniform density distribution, consisting of either ordered or unordered random pel arrangements. These masks have helped to hide pel-location errors and banding problems. The unordered variety has helped to hide pel-location errors somewhat better, similar to error-diffusion techniques. However, both types of masks do not eliminate the banding problems, and significant improvements can be made. A problem with a uniformly distributed mask is the abrupt transitions or steps in the "accumulated density."

The accumulated shingle mask distribution consists of the apparent steps seen while an ink jet printer is printing. For a conventional four-pass system, the accumulated distribution of a uniformly distributed shingle mask is depicted in FIG. 1. The X-axis represents the number of scanlines, while the Y-axis represents the numbers of drops printed. (This represents a 1-bit shingle mask.) The number of accumulated drops changes drastically every time another group of nozzles is used for the "next" pass. The nozzle groupings are indicated by the designations G1, G2, G3, and G4.

During the first pass, the accumulated drops will be at the level indicated by the reference numeral 10. During the second pass, the number of drops will suddenly rise to the level indicated by the reference numeral 12. During the third pass, the number of accumulated drops printed will rise to the level indicated by the reference numeral 14. Finally, the number of drops printed will rise to the "intended coverage level" which is indicated by the reference numeral 16.

As can easily be seen, there are abrupt transitions in the accumulated density, mainly because the shingle mask has a uniform distribution pattern. The result of this is illustrated in FIG. 2, which depicts the accumulated banding pattern as the passes are made. As noted above, FIGS. 1 and 2 are representative of a 4-pass shingling system, in which the first pass prints the scanlines (or nozzle numbers) in the range of 241–320, while the second group or pass represents the scanlines (nozzles) in the range of 161–240, the third "band" represents the scanlines (nozzles) in the range of 81–160, while the fourth pass or band represents the scanlines (nozzles) in the range of 1–80. As can be seen from FIG. 2, there is a very distinct banding pattern, as illustrated in the accumulated pass bands indicated by the reference numerals 20, 22, 24, and 26.

Even after the printing process has been completed, remnants of these shingle mask steps may be visible. The leftover remnants comprise the defect known as banding. The sharp transition regions are caused by variations in drying time, bleeding characteristics, forms advance error, and other reasons. Depending on the banding frequency, the defects may or may not be detectable by the human eye. In this example, a noticeable banding transition region is present every eighty scanlines, and if the printing resolution is 600 dpi (dots per inch), then the banding transition region is present every 80/600 inches.

As described above, uniformly distributed shingle masks tend to have banding problems due to the sharp transition regions present after each pass of the printhead. It would be an improvement in the banding characteristics of an ink jet printer to eliminate the sharp transition regions.

SUMMARY OF THE INVENTION

Accordingly, it is an advantage of the present invention to eliminate sharp transition regions to assist in removing banding problems. It is another advantage of the present invention to provide a shingle mask that creates a smooth accumulated shingle mask distribution, which will tend to eliminate the sharp transition regions that create the noticeable banding characteristics of ink jet printers. It is a further advantage of the present invention to provide a shingle mask derived from a shingle mask density distribution that is substantially trapezoidal in shape.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for reducing ink jet printer banding effects is provided, in which the method comprises: (a) selecting a profile for an accumulated shingle mask distribution, wherein the profile: (i) exhibits a substantially flat horizontal shape in a first portion, and (ii) exhibits a substantially smooth decreasing shape in a second portion; (b) quantizing the accumulated shingle mask distribution, and deriving at least one shingle profile corresponding to the quantized accumulated shingle mask distribution, wherein the quantized accumulated shingle mask distribution includes a third portion and a fourth portion which correspond, respectively, to the first and second portions of the accumulated shingle mask distribution; (c) deriving a shingle mask density distribution using the at least one shingle profile; and (d) deriving a shingle mask corresponding to the shingle mask density distribution.

In accordance with another aspect of the present invention, a method for generating a shingle mask used in a printer capable of printing drops in a plurality of printing passes, in which the method comprises: (a) selecting initial constraints, including: (i) a mask height and width, (ii) a number of drops per pel, and (iii) a number of printing passes corresponding to full intended coverage; (b) selecting a shape of a banding profile, in which the shape comprises a plateau portion and a substantially smooth decreasing portion; (c) selecting a height of the plateau portion; (d) quantizing the banding profile, thereby deriving a quantized banding profile, and determining a plurality of shingle profiles, wherein a plateau portion of the quantized banding profile has a horizontal length that significantly exceeds a horizontal length of any of a plurality of discrete levels of the derived quantized banding profile; (e) based upon the plurality of shingle profiles, deriving a shingle mask density distribution; and (f) based upon the shingle mask density distribution, generating a shingle mask of the mask height and width.

In accordance with a further aspect of the present invention, a shingle mask used in a printer capable of printing drops in a plurality of printing passes, in which the shingle mask comprises: a bitmap pattern of a predetermined sequence having a mask height and width, the bitmap pattern being derived from a shingle mask density distribution which exhibits a substantially trapezoidal, but not rectangular, shape on a graph in which an X-axis represents drops printed and a Y-axis represents nozzle positions on a printhead.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 3:
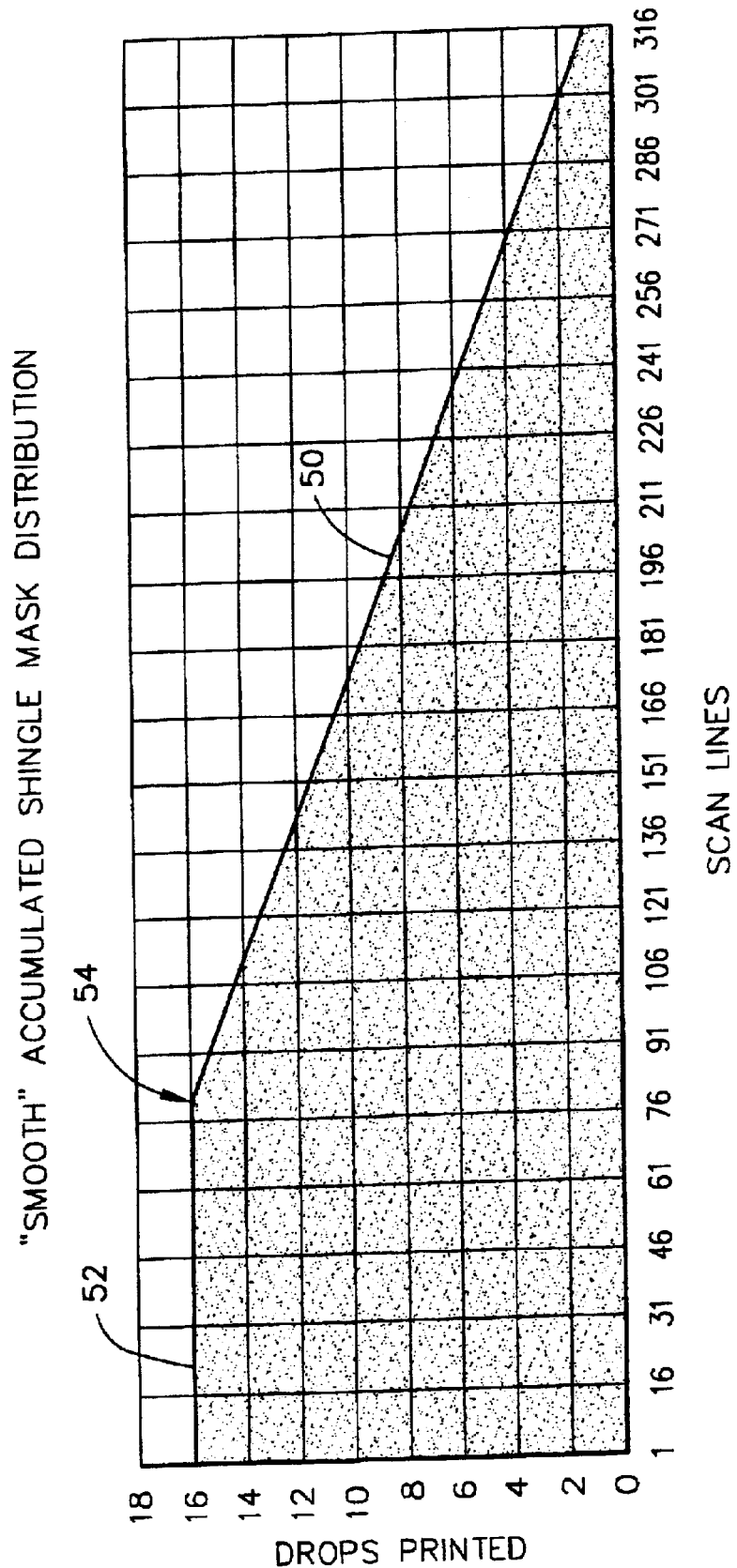
FIG. 3 is a graph of an accumulated shingle mask distribution that is substantially "smooth," as according to the principles of the present invention.

Referring now to FIG. 3, an example of a "smooth" transition profile is illustrated in the form of an accumulated shingle mask distribution. In this example, there are 320 nozzles in the ink jet printhead, and single-bit data is used. The number of drops printed saturates at the value 16, as illustrated by the horizontal line at reference numeral 52. Rather than exhibiting a step-down transition profile (as known in conventional multi-pass ink jet printers), the "smooth" accumulated shingle mask distribution used in the present invention is illustrated as it decreases in a straight line, as indicated at the reference numeral 50. The full intended coverage line 52 and the decreasing-sloped line 50 meet at a point of transition 54. For four-pass printing, the horizontal line 52 extends through the first eighty scanlines, and this is illustrated by the fact that the transition point 54 is at the location between 80 and 81 scanlines on FIG. 3.

The form of the graph illustrated in FIG. 3 is not the only possible form of a smooth transition profile. This profile may be of any shape, although it is probably best if the profile is monotonically decreasing. The profile illustrated in FIG. 3 exhibits an ideal shape, however, an ink jet printer typically is a binary device, which means that each printed pixel is either completely on or completely off. Therefore, the actual banding profile will have to be broken into a finite number of quantization levels.

Figure 4:
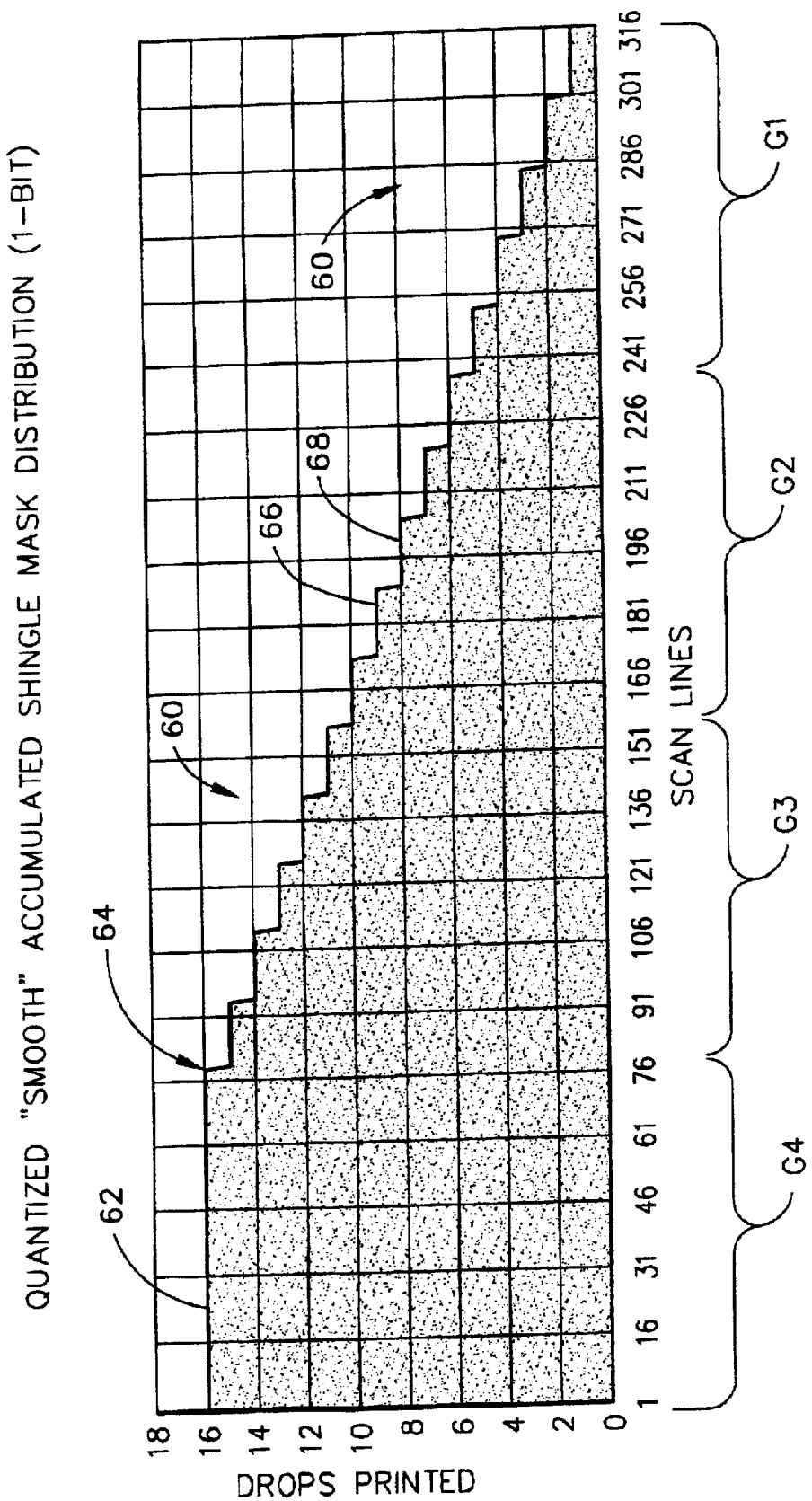
FIG. 4 is a quantized "smooth" accumulated shingle mask distribution, as per the principles of the present invention.

The number of quantization levels is determined by the width of the shingle mask. For example, if the mask is sixteen pels wide, then there are sixteen quantization levels. FIG. 4 illustrates a profile that can be physically realizable in which the data is quantized. This profile is the physically realizable form of the ideal smooth transition banding profile illustrated in FIG. 3.

FIG. 4 is also divided into four groups of scanlines or nozzle locations, designated G1, G2, G3, and G4. The Y-axis represents the number of drops printed, which saturates at a value of sixteen, and which is indicated by the horizontal line at reference numeral 62. The so-called "smooth" transition has been quantized into individual steps, however, these steps are arranged to closely approximate a straight line, as indicated at the reference numeral 60. Certain individual steps are indicated at the numeral 66 and 68, for example.

The quantized sloped portion of the graph of FIG. 4 meets the intended coverage level at line 62 at a transition point 64. This transition point is at the same location as the transition point 54, as illustrated in FIG. 3. As noted above, the graph of FIG. 4 is useable for a shingle mask that is sixteen pels wide, using single-bit data, and useable in four-pass printing.

Using the desired banding profile (i.e., the upper perimeter shape of the graph in FIG. 4), the distribution of the shingle mask can be determined. One way to accomplish this will now be described: the banding profile for scanlines 241–320 were created exclusively from scanlines 241–320 of a single shingle pattern. This can be seen by viewing FIG. 5, in which the banding profile "B1" exhibits the same shape as that of the shingle profile "S1." It is easy to see that the stepped shape of the profile, at reference numeral 70, is the same for both B1 and S1. Therefore, the distributions for scanlines 241–320 of the shingle profile is equal to the distributions for the scanlines 241–320 of the banding profile.

Scanlines 161–240 of the banding profile (i.e., the shape "B2" of FIG. 5) consists of the superposition of scanlines 161–240 of one shingle pattern and scanlines 241–320 of another, identical shingle pattern (i.e., from the subsequent printing pass). Therefore, the banding profile B2 consists of all pixels from scanlines 161–240 of one shingle pattern, plus all pixels from scanlines 241–320 of another shingle pattern. Scanlines 241–320 of the shingle profile have already been determined from the previous step (i.e., relating to the shingle profile S1). Therefore, scanlines 161–240 of the shingle profile (i.e., the shape "S2" of FIG. 5) must equal the difference between scanlines 161–240 of the banding profile and scanlines 241–320 of the shingle profile. The contribution from scanlines 161–240 of the shingle pattern S2 has a rectangular shape, with its top horizontal line designated by the reference numeral 74 on FIG. 5. The contribution of the shingle pattern from scanlines 241–320 is the shingle pattern S1, which has a stepped shape as indicated by the reference numeral 70 on FIG. 5. Together, these two regions S1 and S2 comprise the banding profile (B2) for scanlines 161–240. Mathematically, this can be expressed as follows:

$$S2=B2-S1.$$

Figure 5:
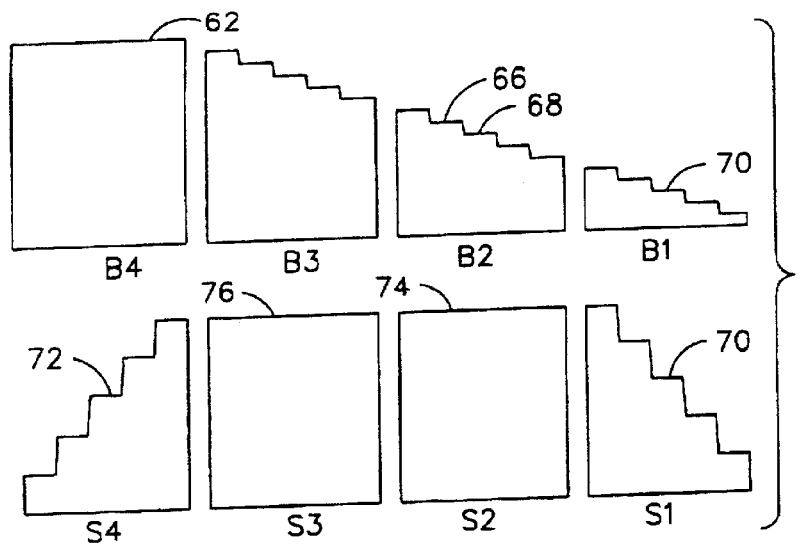
FIG. 5 illustrates certain banding profiles and shingle profiles used in the accumulated shingle mask distribution of FIG. 4.

As can be seen in FIG. 5, the overall shape of the banding profile B2 has a stepped top perimeter region, and also has the appearance of the steps 66 and 68 which appeared on the quantized accumulated shingle mask distribution graph of FIG. 4. The spacings and step-height intervals will essentially be identical for the top perimeter shapes of all of the banding profiles B1, B2, and B3 of FIG. 5. Of course, if the number of quantization levels were to change, or if the width of the shingle mask were to change, then these shapes for the top perimeter regions of the banding profiles would correspondingly also change.

Scanlines 81–160 of the banding profile (i.e., the banding profile "B3") consists of the superposition of scanlines 81–160, 161–240, and 241–320 of three separate shingle patterns. The shingle profile for scanlines 161–320 has already been determined, which consists of the shingle profiles S1 and S2. Thus the shingle profile for scanlines 81–160 (i.e., for shingle profile "S3") consists of the banding profile for scanlines 81–160, less the shingle profiles for the scanlines 161–320. This is mathematically expressed as follows:

$$S3=B3-S2-S1.$$

On FIG. 5, the shingle profile S3 exhibits a top horizontal line at the reference numeral 76. The overall shape of the banding profile B3 is similar to the banding profile B2, although the banding profile B3 is taller, while still having the same staircase-type top perimeter shape.

The scanlines 1–80 of the banding profile consist of the superposition of all four regions of the shingle profile. Similar to the above, the shingle profile "S4" for scanlines 1–80 equals the banding profile "B4" for scanlines 1–80, less the shingle profiles S3, S2, and S1 for scanlines 81–160, 161–240, and 241–320, respectively. The shingle profile S4 can be expressed in mathematical terms, as follows:

$$S4=B4-S3-S2-S1.$$

As can be seen on FIG. 5, the banding profile B4 has an overall rectangular shape, and its top border (perimeter) is a horizontal line at 62. This is the same horizontal line or "plateau" 62 that was seen in FIG. 4. On the other hand, the shingle profile S4 does not have a horizontal line for its top perimeter boundary, but instead has another staircase-type appearance, as seen at 72 on FIG. 5. In the shingle profile S4, the slope of the approximation of a line conforming to this staircase 72 is in the opposite direction as the slope of the approximation of a line of the staircase shape at 70 of the shingle profile S1.

Figure 6:
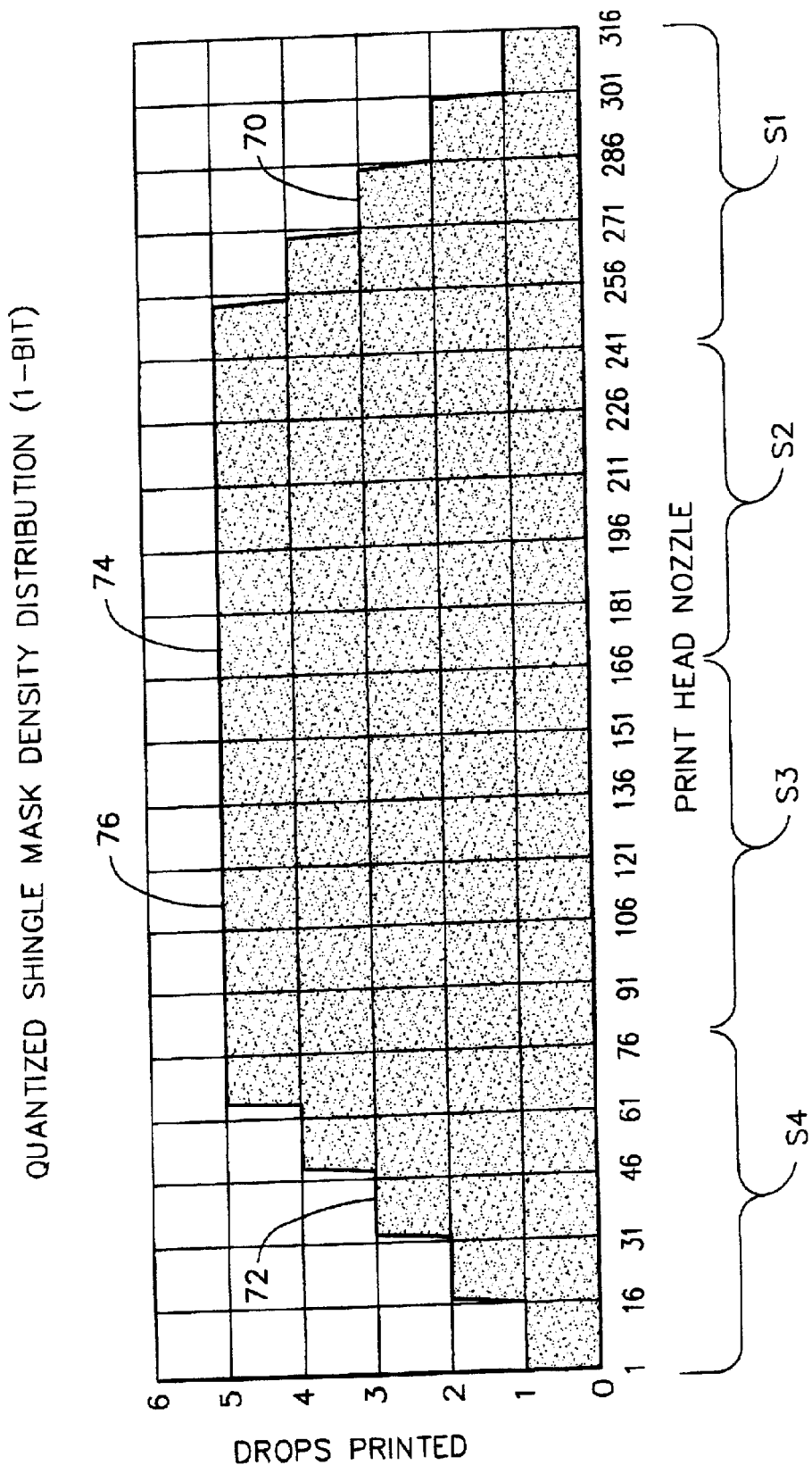
FIG. 6 is a graph depicting the quantized shingle mask distribution using the quantized accumulated shingle mask distribution of FIG. 4.

The shingle profiles S1–S4 may be combined together to form the complete shingle mask density distribution, as seen in FIG. 6. Of course, in FIG. 6 the shingle mask density distribution is quantized, and therefore, the sloped stair-case shapes are seen instead of a smooth straight line, which would be the ideal shape in an "analog" world. An alternative ink jet printhead construction could literally use an analog control signal, and in this alternative printhead, the "smooth" trapezoidal shape could be maintained instead of being quantized as per FIG. 6. This would generate a "smooth" shingle mask, which would be more in the form of a filter than a true mask that "hides" quantized dots.

In the example of FIG. 6, the quantized graph is a one-bit mask distribution, in which the intended coverage level is five drops printed per scanline/nozzle location. Note that the distribution for the shingle profile S4 starts with a single pixel or drop printed and increases linearly to five pixels, as seen by the staircase-shape perimeter 72. The shingle profiles S3 and S2 remain constant at five pixels or drops printed, as indicated at 76 and 74, respectively. The distribution for the shingle profile S1 begins at five pixels or drops printed, then linearly decreases to one pixel, as seen by the staircase-shape perimeter 70. The result is a shingle mask density distribution that approximates the shape of a trapezoid. In this example, the mask is sixteen-pels wide, in which there is one drop per pel, and in which the "bottom" of the printhead nozzle array starts at the numeral 1 and increases to the "top" of the printhead nozzle array, at the numeral 320. It will be understood that many different methods could be used to create the corresponding shingle mask once this quantized shingle mask density distribution has been derived, as seen in FIG. 6. Improved results are possible when a methodology is used to create the shingle mask according to a set of rules, which are described below.

Figure 1:
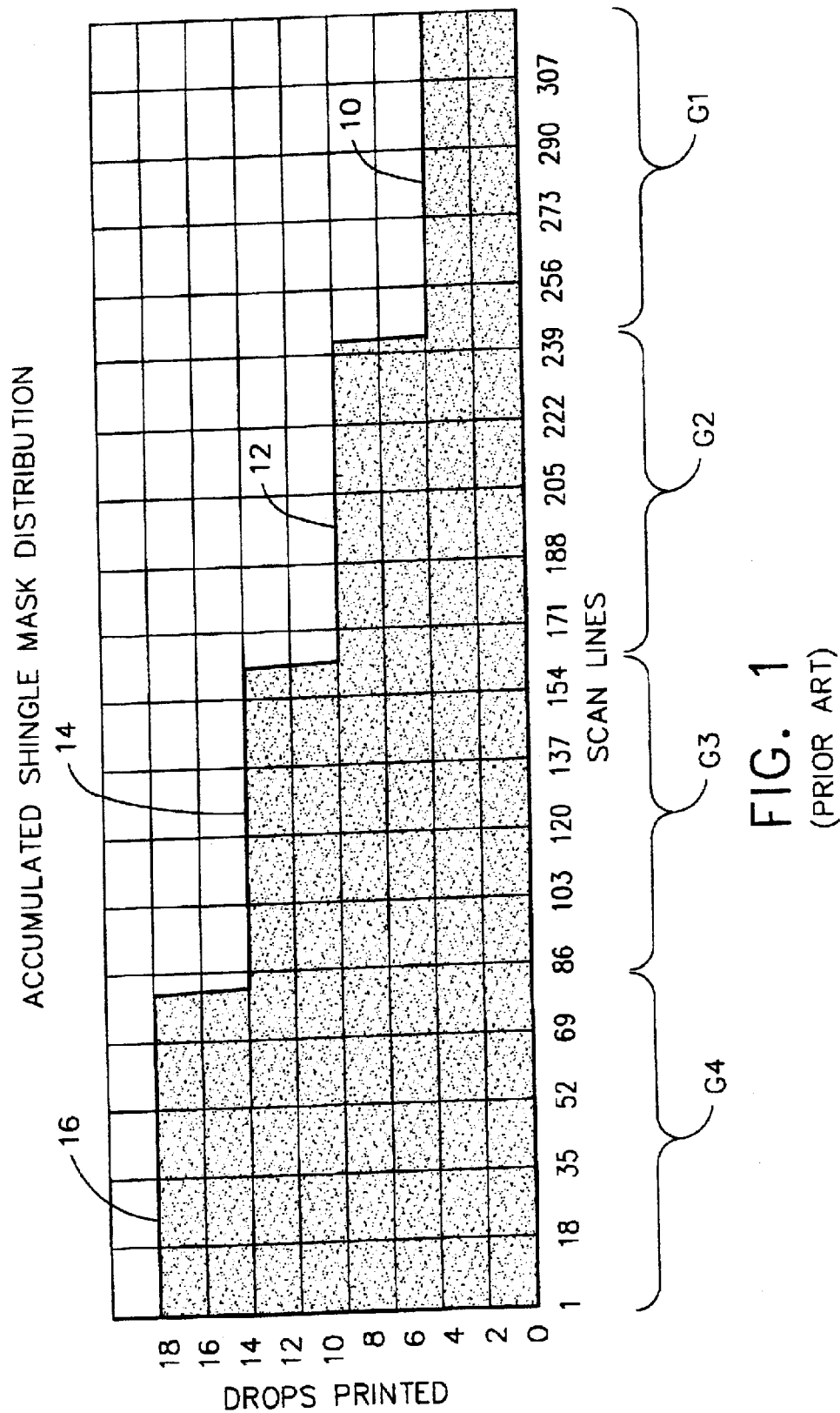
FIG. 1 is a graph showing an accumulated shingle mask distribution for a four-pass printer known in the prior art.
Figure 2:
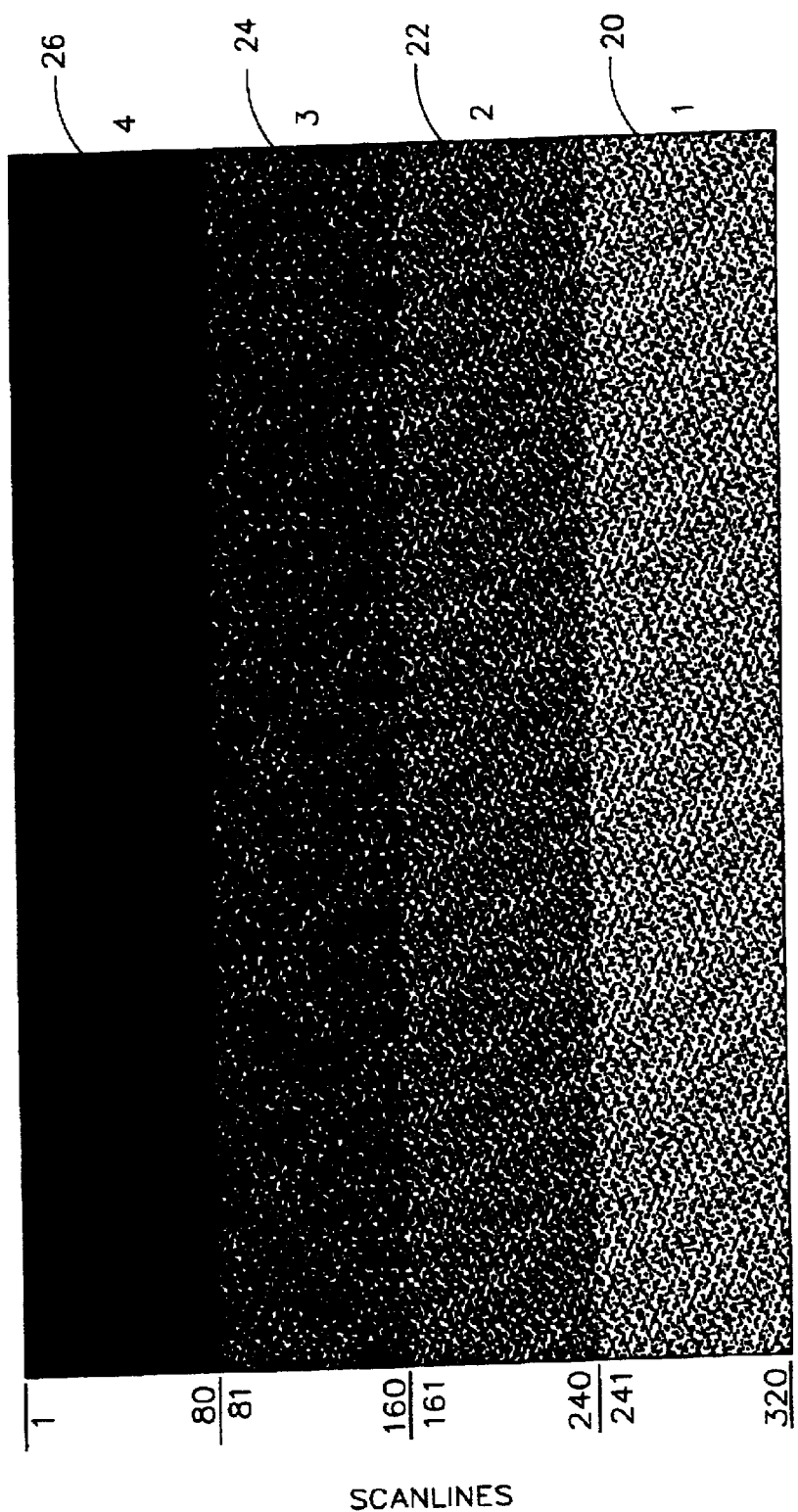
FIG. 2 is an image depicting the accumulated banding pattern due to the accumulated shingle mask distribution of FIG. 1.
Figure 7:
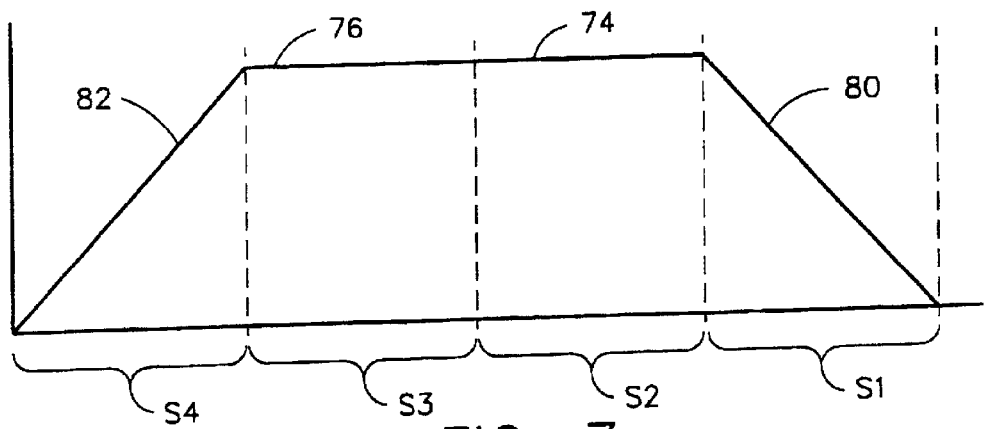
FIG. 7 depicts a theoretical shingle mask distribution that is substantially trapezoidal in shape, as per the principles of the present invention.

Before discussing these rules, it will now be discussed that the shape of FIG. 6 has an ideal trapezoid shape, which is illustrated in FIG. 7. The shingle profiles S1–S4 correspond to sloped lines 80 and 82 or horizontal lines 74 and 76, for the respective shingle profile regions. It should be noted that the prior art accumulated shingle mask distribution of FIG. 1 would generate a shingle mask distribution that is rectangular in shape.

Figure 8:
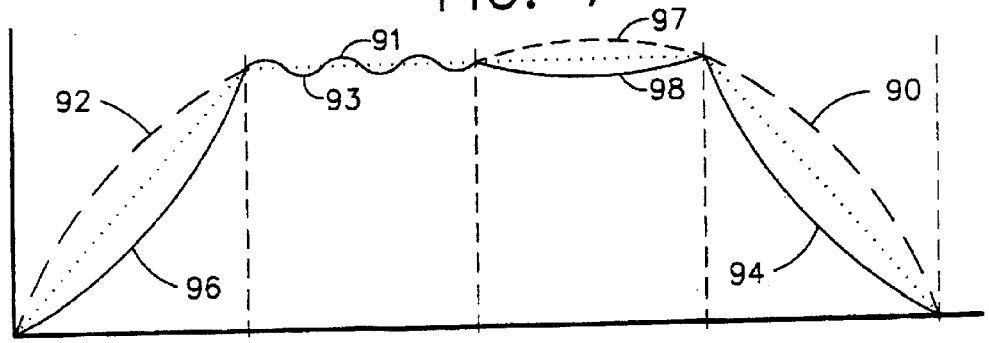
FIG. 8 is an illustration of a variation of the trapezoidal shape of the graph of FIG. 7.

While this trapezoid shape is an exemplary shape, variations on the theme can be used advantageously for certain printheads, or for certain color sciences in the circumstance of color ink jet printers. FIG. 8 shows some of these variations, in which the sloped lines 80 and 82 from FIG. 7 have been replaced by curved lines. On FIG. 8, the curved lines 90 and 92 illustrate a pair of convex shaped curves that replace the straight lines; alternatively, concave curved lines, as seen at 94 and 96, could be used for other alternative printhead shingle mask designs.

Other variations are also depicted on FIG. 8, in which the substantially flat line segments 74 and 76 have been replaced by curved lines. Line segment 74 could be replaced, e.g., by a convex curve 97, or by a concave curve 98. Line segment 76 could be replaced, e.g., by a sinusoidal curve that has both "positive" inflections 91 and "negative" inflections 93. These examples on FIG. 8 are merely illustrative, and many variations of curved lines (or arcs) are certainly possible. It will be understood that FIG. 7 was essentially derived from FIG. 3, and therefore, to generate a shingle mask density distribution such as illustrated in FIG. 8, it is also possible to provide an accumulated shingle mask distribution that uses some type of curved lines in FIG. 3, or other manner of inflection in the line segments of FIG. 3.

A set of exemplary rules to create a shingle mask according to the present invention will now be discussed. The first rule (Rule 1) is that there should not be any pels located diagonally within X pels from the current pel. The second rule (Rule 2) is that there should not be any pels located vertically within Y pels from the current pel. The third rule (Rule 3) is there should not be any pels located horizontally within Z pels from the current pel. The fourth rule (Rule 4) is that the number of "ON" pels in a given row of the shingle mask should equal the quantized shingle mask density value for the current scanline (or printhead nozzle position). The fifth rule (Rule 5) is that every dot must be printed after all passes (e.g., four passes) of the printhead.

Depending on how the mask is generated, it may not be possible to abide by all of the above rules. In that circumstance, the rules may be relaxed in any given order, depending upon the design requirements. For example, the density value could be allowed to deviate from the desired value by ±1. Another relaxation of the rules may reduce the values of X, Y, or Z (perhaps all the way to zero). Another circumstance of interest is when the first two rules are relaxed to the point where X and Y must both be equal to zero (0): it may be important for some ink jet printers that the value for Z never be equal to zero (0), simply for the fact that the ink jet nozzles realistically may not be able to react quickly enough to produce two consecutive dots in the X (or "scan") direction. Finally, if the fourth rule must be violated to place all of the dots "somewhere" in the density distribution, then it is recommended that the first locations to be considered for placement should be in the mid-region of the trapezoidal shape (e.g., in the G2 or G3 groups), rather than in the "end" regions of the trapezoidal shape (e.g., in the G1 or G4 groups), and especially not in the very edge of the nozzle numbers (e.g., not at the very lowest or very highest nozzle or scanline numbers).

Figure 9:
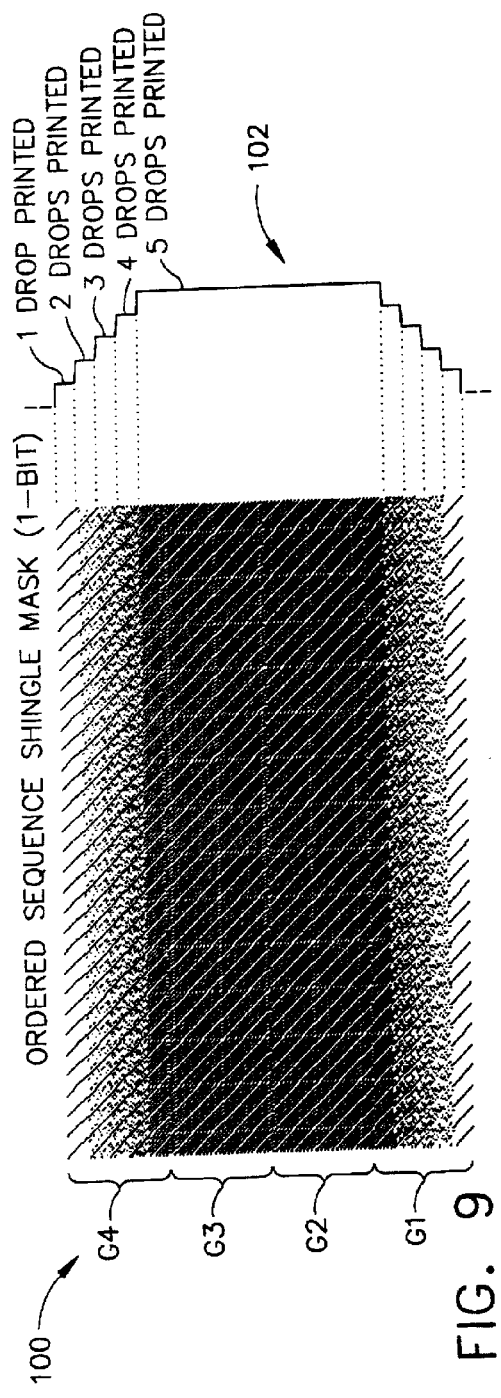
FIG. 9 is a bitmap image of an exemplary ordered sequence shingle mask, as per the principles of the present invention.

To obtain the desired shingle mask density distribution, the shingle mask may consist of predefined patterns, randomly positioned pixels, or some combination of predefined patterns and randomly positioned pixels. Using predefined patterns, a single-bit mask was created, as illustrated in FIG. 9. Since predefined patterns were used, this one-bit mask was created using an ordered sequence.

The shingle mask of FIG. 9 is generally referred to by the reference numeral 100, and has four horizontal regions or "groups" of pixel densities, G1–G4. This shingle mask 100 is derived from the trapezoidal shape quantized shingle mask distribution, in reference to the numeral 102. The values for X, Y, and Z were, respectively, {0,1,1} for creating this mask 100. Some of the rules were relaxed in this example mask: when this occurs, it is recommended that the rules be relaxed in their numeric order (from lowest to highest). Rule 5 should never be relaxed, if at all possible.

When viewing FIG. 9, it is easy to see the density regions that make up this shingle mask 100. The changes in density within the regions G4 and G1 offer the advantage of increasing the number of banding regions, while decreasing their size. This effectively increases the banding frequency, thereby yielding less noticeable banding artifacts. The improved appearance when using this shingle mask 100 is evident in the banding pattern illustrated in FIG. 10.

Figure 10:
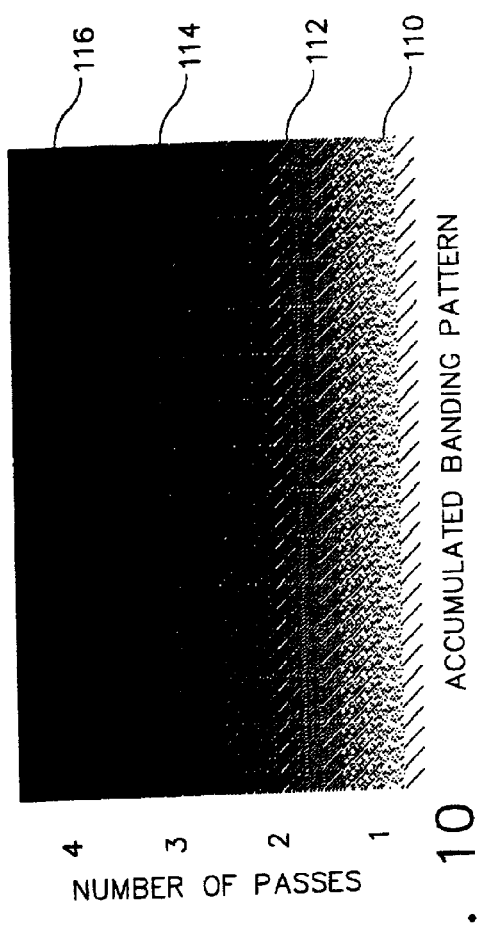
FIG. 10 illustrates the accumulated banding pattern using the shingle mask of FIG. 9.

FIG. 10 illustrates the accumulated banding pattern created by the ordered sequence shingle mask of FIG. 9. As can be seen in FIG. 10, the shingle mask 100 has created sixteen banding regions, thereby increasing the banding frequency from eighty scanlines per inch to only twenty scanlines per inch. Each of the regions 110, 112, 114, and 116 has four different "banding regions" of different density each. These regions 110–116 represent individual regions for a single print pass, in which the number of passes is 1–4, as enumerated on FIG. 10.

Figure 11:
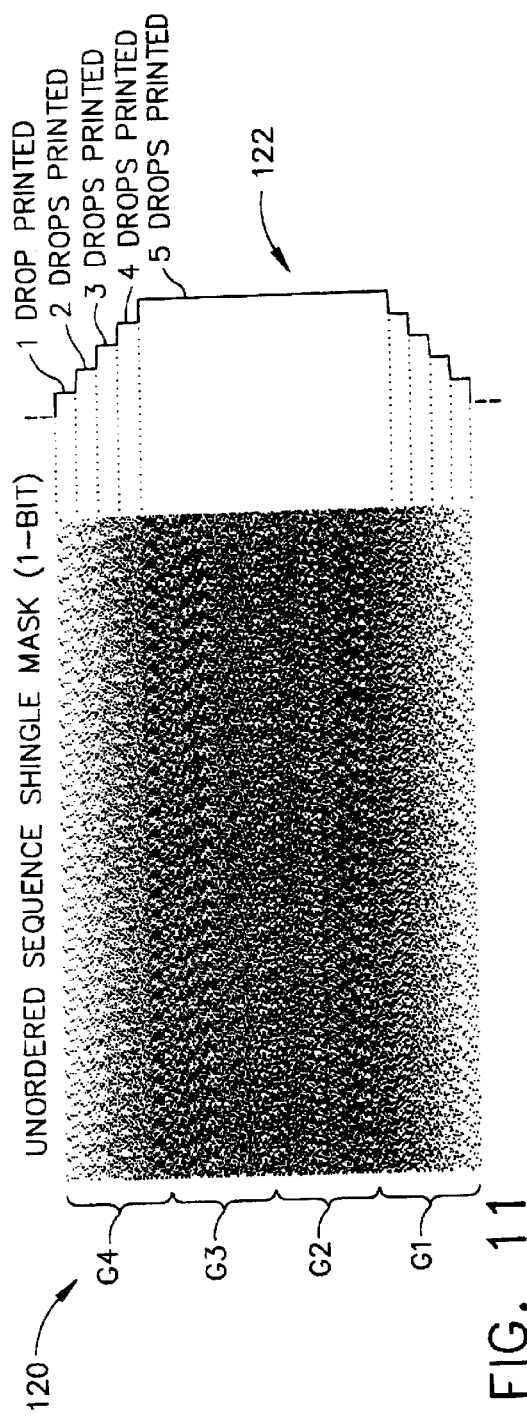
FIG. 11 is a bitmap image of an exemplary unordered sequence shingle mask, as per the principles of the present invention.

As an alternative to the ordered sequence shingle mask of FIG. 9, an unordered sequence shingle mask can be created using random placement of the pels, or perhaps using a stochastic algorithm for placement of the pels. An example unordered sequence shingle mask for single-bit data is provided at 120 on FIG. 11. This shingle mask 120 also has four major pixel or dot placement groupings, G1–G4. In the groupings G1 and G4, the density changes according to the number of drops that are to be printed. The shingle mask density distribution pattern is depicted at 122, which determines the number of drops that are to be printed in each of the horizontal regions, as indicated on the drawing. In the example of FIG. 11, the shingle mask was created in a random sequence using white noise. As noted above, any type of random sequence could be used, or a semi-random sequence such as a stochastic methodology (such as in stochastic screens used in halftoning).

In the shingle mask of FIG. 11, the values for X, Y, and Z were, respectively, {1,1,1} for creating this mask 120. Again, some of the rules were relaxed in this example mask to accommodate all of the dot placements.

Figure 12:
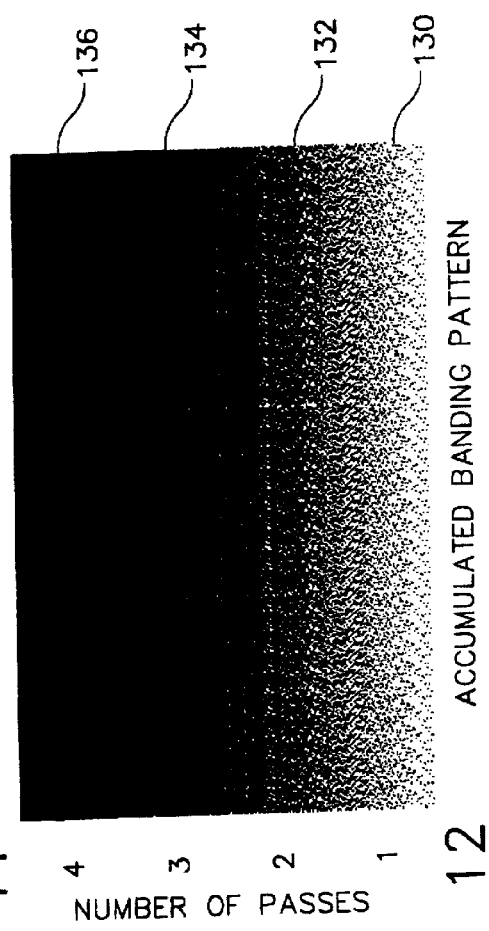
FIG. 12 illustrates the accumulated banding pattern using the shingle mask of FIG. 11.

Note that it is more difficult to determine the delineation between the banding regions in the shingle mask 120 as compared to the non-random shingle mask 100 of FIG. 9. The random generation of the shingle mask 120 has the effect of smoothing the transition from one density level to another, this also can be seen in the accumulated distribution or accumulated banding pattern, as illustrated in FIG. 12. Each of the number of passes 1–4, corresponding to the numerals 130, 132, 134, and 136, respectively, produces several bands of density. As in the accumulated banding pattern of FIG. 10, the shingle mask has created sixteen banding regions, thereby increasing the banding frequency from eighty scanlines per inch to only twenty scanlines per inch.

A patent by Serra, U.S. Pat. No. 6,067,405, discusses the creation of a shingle mask using random placement of the pels. However, Serra did not use a shingle mask distribution during the mask creation. The shingle mask distribution of FIG. 11 is a significant deviation from the teachings of Serra.

A shingle mask distribution can also be created for a multi-level ink jet printer. For example, suppose that multiple tone levels are created by printing multiple dots at the same pel location. If "D" represents the maximum number of ink drops required by the printer to reach full intended coverage, and assuming that at most one dot is desired to be printed at any given pel location within a single pass, then the number of shingle patterns must be at least as large as D. The shingle mask will be made of values between zero (0) and D.

At any given pel location, there will be exactly one instance of each value from 1 to D, distributed across the set of shingle patterns. When the number of shingle patterns exceeds D, the remainder of the shingle patterns will contain the value zero (0) at this location. As with conventional bi-level shingling, nothing is printed when the shingle value equals zero (0). For non-zero shingle values, the decision to print a dot depends upon the number of requested dots for that pel. In particular, a dot will be printed when the shingle mask value is greater than or equal to the desired number of drops for the pel at this particular location. Mathematically, if the desired number of drops is less than or equal to the mask value, then print a drop, which can be expressed as an equation:

Desired Number Of Drops ≦ Mask Value.

A patent by Chang, U.S. Pat. No. 6,082,849, describes a similar procedure in which the number of drops is less than or equal to the mask value. In the present invention, an additional criteria is the shingle mask distribution that must be adhered to when designing the mask, similar to the single-level methodology described above. The accumulated shingle mask distribution of a multi-level device changes as compared to the single-level device. The maximum number of "ON" pels (or drops printed) in any given situation is the mask width times the number of drops. Given this constraint, the distribution can be created and quantized accordingly with certain limitations. One main limitation is that the density of a single scanline can never be greater than the width of the shingle mask. A sample distribution is illustrated in FIG. 13.

Figure 13:
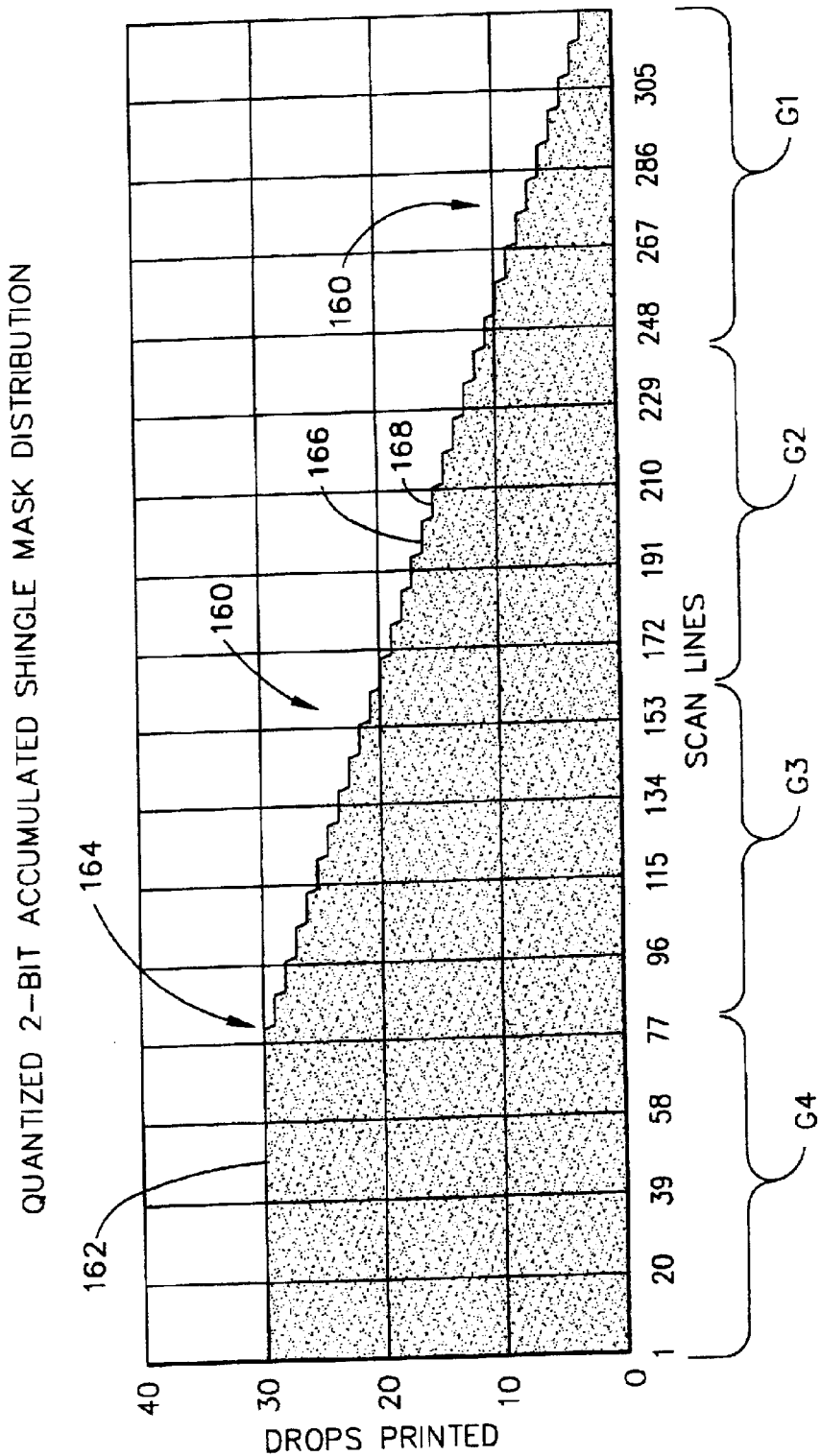
FIG. 13 is a graph of a quantized accumulated shingle mask distribution using two-bit data, as according to the principles of the present invention.

FIG. 13 illustrates a quantized 2-bit accumulated shingle mask distribution, in which the mask is sixteen pels wide and 320 nozzle locations (or scanlines) in height. Although 2-bit data can represent up to three drops per pel, in this example, the maximum number of drops per pel is two. Moreover, four passes are to be made using this accumulated shingle mask distribution.

In FIG. 13, the scanlines are divided into four groups, designated G1–G4. The maximum number of drops printed for full intended coverage is thirty-two (32), and is designated at the horizontal line 162 which has the "plateau" appearance similar to the plateau 62 of FIG. 4. At the "breakpoint" 164, the distribution begins to fall in a near-linear fashion, although when quantized this has the appearance of multiple steps, as indicated by the reference numeral 160. Two of the steps are designated at the reference numerals 166 and 168.

The additional number of "ON" pels tends to smooth the "ramp" on the accumulated shingle mask distribution of FIG. 13, as compared to the "ramp" using the 1-bit accumulated distribution illustrated in FIG. 4. This more smooth ramp will make it more difficult to distinguish where the density levels change between scanlines. On FIG. 13, the values for the ramped region of the profile range from two (2) to thirty-two (32) printed drops. When using this accumulated distribution, a quantized shingle mask density distribution can be generated as illustrated in FIG. 14.

Figure 14:
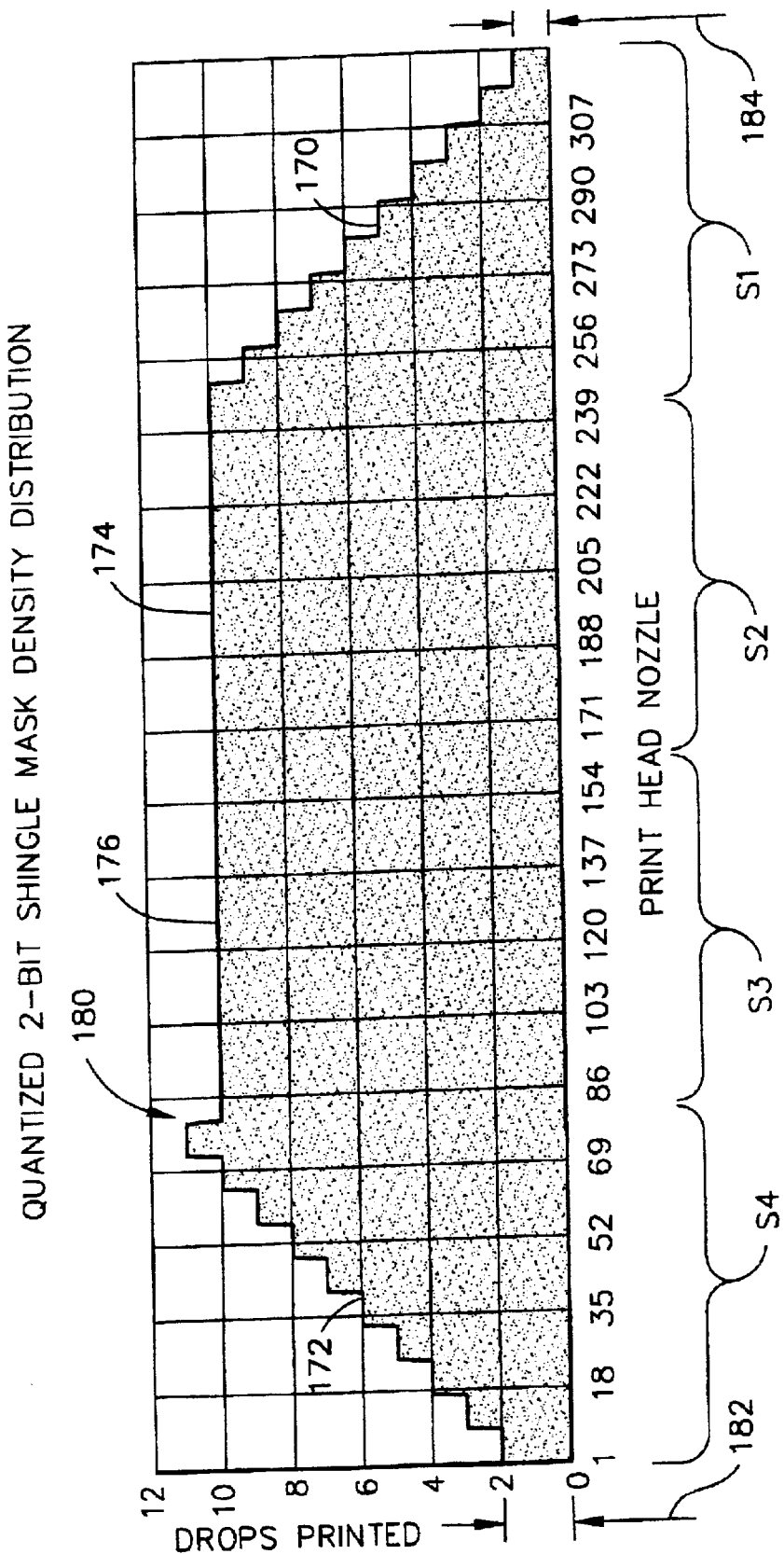
FIG. 14 is a graph illustrating a quantized shingle mask distribution using the accumulated shingle mask distribution for two-bit data of FIG. 13.

In FIG. 14, the groups of scanlines are represented by four shingle mask patterns or shingle profiles, S1–S4, which are similar in shape to the shingle profiles S1–S4 depicted in FIG. 5. The uppermost perimeter regions of the shingle profiles S2 and S3 are represented by horizontal line segments 174 and 176. The shingle profiles S1 and S4 represent the ramps, which when quantized, have the appearance of a staircase, as depicted at the reference numerals 170 for S1 and 172 for S4.

In the quantized 2-bit shingle mask density distribution illustrated in FIG. 14, there is a small overshoot 180 between the nozzles in the range of 73–80, which is also contained in the 2-bit accumulated shingle mask density distribution S4. As described above in reference to FIGS. 4–5, the creation of the shingle mask density distribution for the shingle profiles S1 and S4 resulted in the shingle profile S1 being directly copied into the shingle profile S4. When using 2-bit data, the mathematical equivalent as illustrated in FIG. 14 creates the overshoot 180. However, the design of the previous accumulated shingle mask distribution can be adjusted to remove this overshoot, but this would result in non-uniform step widths in the accumulated distribution.

In FIG. 14, the shingle profile S4 begins at two drops printed (or pels "ON"), as seen at reference numeral 182, then increases "linearly" to eleven drops per pel. The number of drops per pel for the intermediate shingle profiles S3 and S2 are at a value of ten (10), which is seen at the reference numerals 174 and 176. In the shingle profile S1, the number of drops printed falls from ten (10) "linearly" down until reaching one drop printed, as seen at the reference numeral 184. Using this shingle mask density distribution or "banding profile," of FIG. 14, a shingle mask can be generated following the rules described above. An example of such a shingle mask is provided below, although this is merely a partial illustration of the final mask, which shows only the first twenty-four rows of the mask. It should be noted that this example uses an ordered sequence for the shingle mask, in which there are a maximum of two drops per pel.

| Pel Density | 00 | 04 | 08 | 12 |
|---|---|---|---|---|
| 1 | 0000 | 0000 | 0001 | 0000 |
| 1 | 0002 | 0000 | 0000 | 0000 |
| 1 | 0000 | 0000 | 2000 | 0000 |
| 1 | 0000 | 0010 | 0000 | 0000 |
| 1 | 0200 | 0000 | 0000 | 0000 |
| 1 | 0000 | 1000 | 0000 | 0000 |
| 1 | 0000 | 0000 | 0000 | 0010 |
| 1 | 0000 | 0000 | 0000 | 2000 |
| 2 | 0000 | 0200 | 0000 | 0001 |
| 2 | 0010 | 0000 | 0000 | 0200 |
| 2 | 1000 | 2000 | 0000 | 0000 |
| 2 | 0000 | 0002 | 0010 | 0000 |
| 2 | 0001 | 0000 | 0000 | 0002 |
| 2 | 0000 | 0020 | 0001 | 0000 |
| 2 | 2000 | 0000 | 0100 | 0000 |
| 2 | 0000 | 1000 | 0000 | 0020 |
| 3 | 0200 | 0000 | 1000 | 1000 |
| 3 | 0001 | 0200 | 0000 | 0001 |
| 3 | 1000 | 0000 | 0200 | 0200 |
| 3 | 0020 | 0002 | 0002 | 0000 |
| 3 | 0000 | 0100 | 0100 | 0002 |
| 3 | 0101 | 0000 | 0000 | 1000 |
| 3 | 0000 | 0020 | 2000 | 0010 |
| 3 | 1000 | 2000 | 0010 | 0000 |

The column titled "Density Value" represents the desired density indicated by the shingle mask distribution. In rows having a density value of one (1), there will be one pel location with a non-zero value. In rows with a density value of two (2), there will be two pel locations with non-zero values. In rows having a density value of three (3), there will be three locations with non-zero values, and so on for rows of the mask greater than the number twenty-four.

Figure 15:
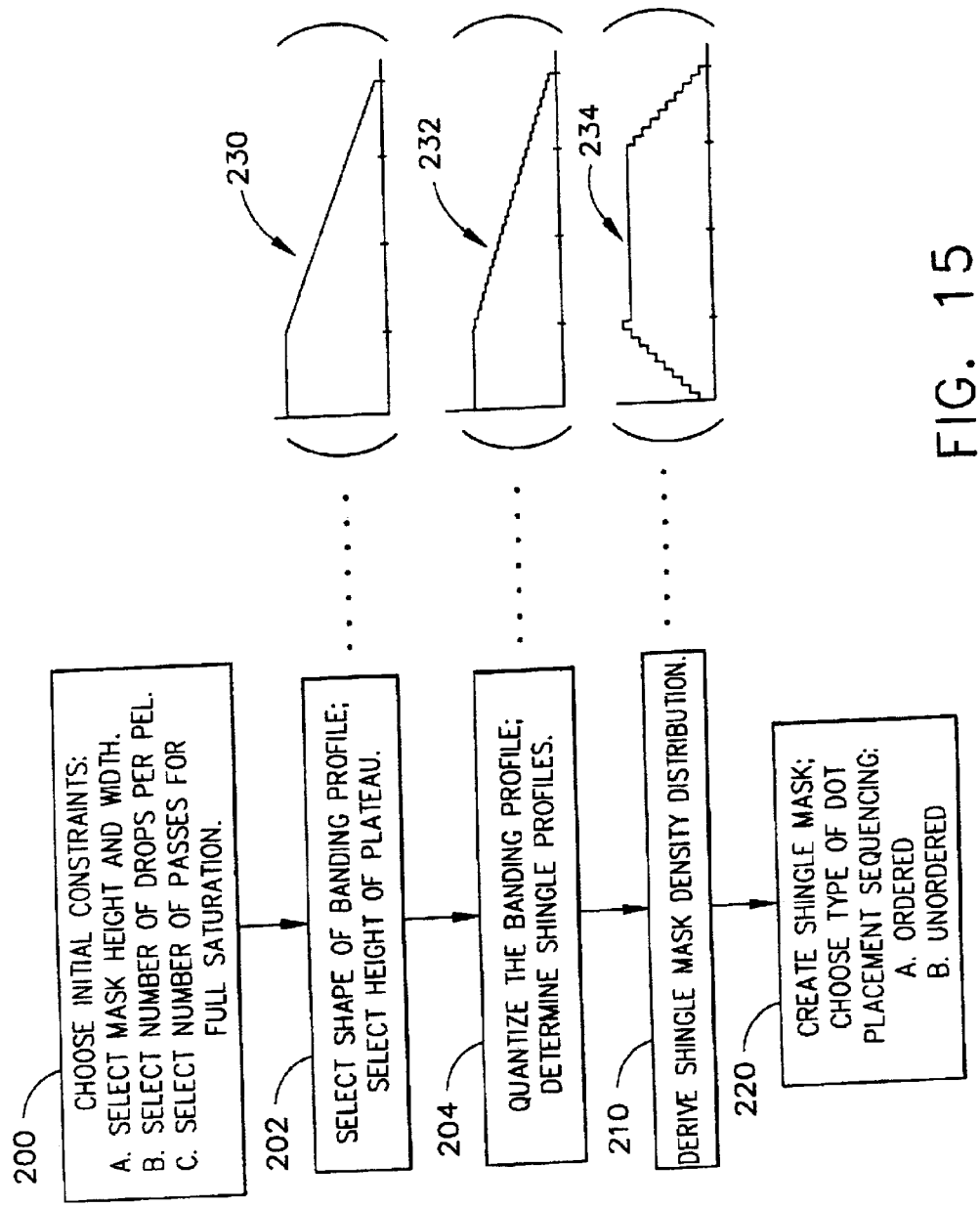
FIG. 15 is a flow chart depicting some of the important steps used in the process of creating a shingle mask, as according to the principles of the present invention.

FIG. 15 is a flow chart that describes some of the important major steps of the process for creating a shingle mask according to the principles of the present invention. At a step 200, the initial constraints are chosen, in which the mask height and width are selected, the number of drops per pel are selected, and the number of passes for full intended coverage are selected. The next step at 202 is the selection of the shape of the banding profile, and the height of the "plateau" that is part of this profile. An example of the shape of the banding profile is illustrated at 230, next to the step 202.

At a step 204, the banding profile is quantized, which will have the appearance as seen at 232 (next to the step 204 on FIG. 15). The quantized banding profile is formed from individual shingle profiles, which are determined from the quantized banding profile overall shape. The next step at 210 is to derive the shingle mask density distribution. If the math utilized to create the shingle mask distribution of FIG. 14 is utilized here, then the shape of the shingle mask density distribution will have the appearance as illustrated at 234 on FIG. 15, which included an overshoot.

The final step is to create the shingle mask, at a step 220. As discussed above, a set of rules will preferably be used when creating the shingle mask. In addition to any type of rules for actual dot placement, the type of dot placement sequencing must also be chosen. The two major choices comprise either an ordered sequence or an unordered sequence of dot placements. If an unordered sequence is to be used, then the dot placement sequencing can be purely random, or could follow some other type of methodology, such as a stochastic methodology.

By use of an accumulated shingle mask distribution (i.e., the banding profile) to generate a shingle mask density distribution, the principles of the present invention will be observed when creating the final shingle mask that can be derived using a variety of methodologies, and according to various predetermined rules. So long as the shape of the banding profile decreases in a "smooth" manner, instead of the stepped manner of conventional shingling systems, then the effects of banding are hidden better than those conventional methods. This occurs because there are more effective banding regions than print passes, in which the banding regions are smaller in size than a single print pass swath. In some of the examples described above, the effect is like having a 16-pass uniform mask distribution while only actually having four print passes. This occurs when there are sixteen density levels within the accumulated shingle mask distribution. The number of effective banding regions will increase as the number of drops per pel increases, or as the width of the shingle mask increases (which affects the number of pels per shingle mask to be used in creating the shingle profiles).

One of the main aspects of the present invention can be most easily visualized when viewing the shape of the banding profile, which is also referred to herein as the accumulated shingle mask distribution (as seen in FIG. 3, for example). When using the present invention, there will always be a plateau area on one end of the banding profile, and after passing through a breakpoint when moving along the nozzle positions or scanlines, the number of drops printed will decrease in a "smooth" manner. This smooth manner may be linear, or perhaps there could be some inflection, as in an arcuate or a convex curved line, or a concave curved line, or perhaps a "wavy" line that inflects in more than one direction (such as a sinusoidal waveform).

In all cases, when the banding profile is quantized, the "plateau" shape at the end of the banding profile that has the maximum number of drops per pel should be the longest horizontal line of the banding profile. In other words, the quantized shape of the decreasing line or curve should have multiple steps, in which the horizontal length of each step is less than the horizontal length of the plateau. The final result is a plateau region that is substantially longer than any individual step width.

When using four-pass printing, the horizontal length of the plateau is one-fourth of the length of the entire banding profile. Even if the mask is only eight pels wide, there would still be steps that have a horizontal distance that is no more than one-half the distance of the horizontal length of the plateau. This would not provide a huge improvement over the conventional four-pass printing that offers the accumulated shingle mask distribution illustrated in FIG. 1, but there still would be some improvement. A much greater improvement occurs when at least sixteen pels make up the width of the shingle mask, even when using only single-bit data per pel. A still greater improvement, of course, is achieved when using 2-bit pel data (while the shingle mask is still sixteen pels wide), to achieve greater resolution.

If the number of drops per pel is increased, then it may be preferable to also increase the mask width to a number larger than sixteen pels. This is not entirely necessary, but would likely lead to improved results.

As noted in the flow chart of FIG. 15, the shingle profiles are created after the quantized banding profile is created. Using the shingle profiles, the quantized shingle mask density distribution is then determined, as viewed on FIGS. 6 and 14, for example. Finally, the shingle mask itself is created, starting with determining the number of drops to be placed in the mask width for certain nozzle positions, as determined by the shingle profile. These drop placements can be determined in an ordered sequence, or an unordered sequence, as discussed above. When the banding profile (i.e., the accumulated shingle mask distribution) has a shape that is monotonically decreasing, the results obtained will be as per the present invention.

One alternative methodology in using the shingle mask of the present invention would be to generate a "set" of such shingle masks, in which a somewhat different individual shingle mask is used for the "next" printing pass. For example, with four-pass shingling, a set of four shingle masks could be provided, and the sequence of use of these four different masks could be random, or the sequence of use even could be directly sequential, if desired. Another example is where the same mask profile is used, but the dot patterns per individual mask are independently created using different random sequences (e.g., a different "seed" pattern could be used for each mask). It will be understood that each of the individual shingle masks of the "set" would be constructed as explained above, and thus be encompassed by the principles of the present invention.

It will be further understood that the principles of the present invention will be applicable not only to ink jet printers, be also to other image-forming devices which exhibit inherent banding defects caused by swath-by-swath or pass-by-pass writing processes.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for reducing printer banding effects, said method comprising:
   (a) selecting a profile for an accumulated shingle mask distribution, wherein said profile: (i) exhibits a substantially flat horizontal shape in a first portion, and (ii) exhibits a substantially smooth decreasing shape in a second portion;
   (b) quantizing said accumulated shingle mask distribution, and deriving at least one shingle profile corresponding to said quantized accumulated shingle mask distribution, wherein said quantized accumulated shingle mask distribution includes a third portion and a fourth portion which correspond, respectively, to said first and second portions of said accumulated shingle mask distribution;
   (c) deriving a shingle mask density distribution using said at least one shingle profile; and
   (d) deriving a shingle mask corresponding to said shingle mask density distribution.

2. The method as recited in claim 1, wherein the substantially smooth decreasing shape of said second portion is monotonically decreasing.

3. The method as recited in claim 1, wherein a shape of the third portion of said quantized accumulated shingle mask distribution has an appearance of a substantially straight horizontal line segment for a majority of its length, and wherein a shape of the fourth portion of said quantized accumulated shingle mask distribution has a substantially staircase appearance comprising a plurality of discrete steps; wherein a length of said substantially straight horizontal line segment of said third portion is significantly greater than a length of a horizontal portion of any one of said plurality of discrete steps of said fourth portion.

4. The method as recited in claim 1, wherein a size of pel data used in said quantizing step is one of: single-bit data, and multi-bit data.

5. The method as recited in claim 1, wherein the step of deriving a shingle mask density distribution utilizes a shingle profile which is substantially stepped in profile along its top perimeter at an exterior end area of said shingle mask density distribution, and which is substantially flat in profile along its top perimeter at an interior area of said shingle mask density distribution.

6. The method as recited in claim 1, wherein said shingle mask density distribution exhibits a profile shape that is substantially trapezoidal in shape.

7. The method as recited in claim 1, wherein the step of deriving a shingle mask includes: (a) determining a number of drops to be placed within a width of said shingle mask for at least one nozzle position, as determined by said shingle mask density distribution; and (b) selecting placement locations of said drops according to one of: an ordered sequence and an unordered sequence.

8. The method as recited in claim 7, wherein the step of selecting placement locations of said drops according to an unordered sequence comprises placing said drop locations in one of: a random sequence and a stochastic sequence.

9. A method for generating a shingle mask used in a printer capable of printing drops in a plurality of printing passes, said method comprising:
   (a) selecting initial constraints, including: (i) a mask height and width, (ii) a number of drops per pel, and
   (iii) a number of printing passes corresponding to full intended coverage;
   (b) selecting a shape of a banding profile, in which said shape comprises a plateau portion and a substantially smooth decreasing portion;
   (c) selecting a height of said plateau portion;
   (d) quantizing said banding profile, thereby deriving a quantized banding profile, and determining a plurality of shingle profiles, wherein a plateau portion of said quantized banding profile has a horizontal length that significantly exceeds a horizontal length of any of a plurality of discrete levels of said derived quantized banding profile;
   (e) based upon said plurality of shingle profiles, deriving a shingle mask density distribution; and
   (f) based upon said shingle mask density distribution, generating a shingle mask of said mask height and width.

10. The method as recited in claim 9, wherein said substantially smooth decreasing portion of the banding profile is monotonically decreasing.

11. The method as recited in claim 9, wherein the height of said plateau portion corresponds to an intended coverage level of drops to be printed.

12. The method as recited in claim 9, wherein a shape of the plurality of discrete levels of said quantized banding profile has a substantially staircase appearance comprising a plurality of discrete steps.

13. The method as recited in claim 9, wherein said number of drops per pel uses one of: single-bit data, and multi-bit data.

14. The method as recited in claim 13, wherein said number of drops per pel uses 2-bit data, said mask height is 16, said mask width is 320, and said number of printing passes is four.

15. The method as recited in claim 9, wherein said shingle mask density distribution exhibits a profile shape that is substantially trapezoidal in shape.

16. The method as recited in claim 9, wherein the step of generating a shingle mask comprises: selecting placement locations of said drops according to one of: an ordered sequence and an unordered sequence.

17. A shingle mask used in a printer capable of printing drops in a plurality of printing passes, said shingle mask comprising: a bitmap pattern of a predetermined sequence having a mask height and width, said bitmap pattern being derived from a shingle mask density distribution which exhibits a substantially trapezoidal, but not rectangular, shape on a graph in which an X-axis represents drops printed and a Y-axis represents nozzle positions on a printhead.

18. The shingle mask as recited in claim 17, wherein said bitmap pattern predetermined sequence comprises one of: an ordered sequence and an unordered sequence.

19. The shingle mask as recited in claim 17, wherein said shingle mask density distribution is derived from a banding profile, in which said banding profile exhibits a shape comprising: (a) a plateau portion and (b) a substantially smooth decreasing portion.

20. The shingle mask as recited in claim 19, wherein said shingle mask effectively increases a number of bands when used with an ink jet printer, while decreasing a height of each of said bands, even though a number of said plurality of printing passes of said printhead has not increased.

21. The shingle mask as recited in claim 17, wherein said substantially trapezoidal shape comprises four perimeter line segments, and wherein said shape exhibits some inflection in at least one of its perimeter line segments.

22. The shingle mask as recited in claim 19, wherein said shingle mask comprises: a bitmap pattern of a predetermined sequence having a mask height and width, said bitmap pattern being derived from a shingle mask density distribution which exhibits a substantially trapezoidal, but not rectangular, shape on a graph in which an X-axis represents drops printed and a Y-axis represents nozzle positions on a printhead.

* * * * *